(12) United States Patent
Maor et al.

(10) Patent No.: US 11,126,713 B2
(45) Date of Patent: Sep. 21, 2021

(54) DETECTING DIRECTORY RECONNAISSANCE IN A DIRECTORY SERVICE

(71) Applicant: Microsoft Technology Licensing, LLC, Redmond, WA (US)

(72) Inventors: Tal J. Maor, Tel Aviv (IL); Itai Grady Ashkenazy, Ramat Hasharon (IL); Gal Z. Bruchim, Tel Aviv (IL); Jonathan M. Monsonego, Tel Aviv (IL); Sivan Krigsman, Hertzliya (IL); Lior Schindler, Giv'atayim (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 173 days.

(21) Appl. No.: 16/377,468

(22) Filed: Apr. 8, 2019

(65) Prior Publication Data
US 2020/0320190 A1    Oct. 8, 2020

(51) Int. Cl.
*G06F 21/55* (2013.01)
*G06F 16/903* (2019.01)
*G06F 21/62* (2013.01)

(52) U.S. Cl.
CPC ...... *G06F 21/554* (2013.01); *G06F 16/90335* (2019.01); *G06F 21/6227* (2013.01)

(58) Field of Classification Search
CPC ............... G06F 21/554; G06F 21/6227; G06F 16/90335
USPC ......................................................... 726/23
See application file for complete search history.

(56) References Cited

U.S. PATENT DOCUMENTS

| 8,046,374 B1 | 10/2011 | Bromwich |
| 10,193,918 B1 | 1/2019 | Patton et al. |
| 2003/0145225 A1* | 7/2003 | Bruton, III .......... H04L 63/1408 726/23 |

(Continued)

FOREIGN PATENT DOCUMENTS

WO    2018130904 A1    7/2018

OTHER PUBLICATIONS

NPL Search Terms (Year: 2020).*

(Continued)

*Primary Examiner* — Syed A Zaidi
(74) *Attorney, Agent, or Firm* — Fiala & Weaver P.L.L.C.

(57) ABSTRACT

A system for detecting directory reconnaissance in a directory service includes a sensor and a directory reconnaissance detector, each of which is executing on one or more computing devices. The sensor determines whether a query that is submitted to a directory server is a suspicious query and, if the query is determined to be a suspicious query, transmits the suspicious query to the directory reconnaissance detector. The director reconnaissance detector includes a receiver, a context obtainer, an alert determiner and an alert transmitter. The receiver receives the suspicious query from the sensor and the context obtainer obtains context information associated with the suspicious query. The alert determiner determines whether a security alert should be generated based at least on the suspicious query and the context information. The alert transmitter generates the security alert responsive to a determination that the security alert should be generated.

20 Claims, 5 Drawing Sheets

(56) References Cited

U.S. PATENT DOCUMENTS

| | | | |
|---|---|---|---|
| 2005/0216955 A1* | 9/2005 | Wilkins | H04L 63/1408 726/23 |
| 2006/0242703 A1* | 10/2006 | Abeni | H04L 63/1408 726/23 |
| 2011/0283360 A1* | 11/2011 | Abadi | H04L 63/1416 726/24 |
| 2013/0167238 A1* | 6/2013 | Russell | G06F 21/577 726/25 |
| 2015/0180894 A1* | 6/2015 | Sadovsky | H04L 67/22 726/22 |
| 2017/0149787 A1 | 5/2017 | Niemela et al. | |
| 2017/0324774 A1* | 11/2017 | Ohayon | H04L 63/1441 |
| 2019/0332766 A1* | 10/2019 | Guri | G06F 21/566 |

OTHER PUBLICATIONS

NPL Search Terms (Year: 2021).*
"International Search Report and Written Opinion Issued in PCT Application No. PCT/US2020/019868", dated May 25, 2020, 26 Pages.

* cited by examiner

DETECTING DIRECTORY RECONNAISSANCE IN A DIRECTORY SERVICE

BACKGROUND

In computing, a directory service maps the names of network resources to their respective network addresses. A critical component of a network operating system, the directory service is a shared information infrastructure for locating, managing, administering and organizing everyday items and network resources. In some architectures, the directory service authenticates and authorizes all users and computers in the network operating system, assigning and enforcing security policies for all computers and installing or updating software. In such architectures, when an attacker targets a directory service, the attacker may first compromise a machine to obtain access to a server that can respond to queries on behalf of the directory service. Although the attacker may have only limited privileges on the compromised machine, once the attacker has compromised the machine, the attacker may then query the directory service to obtain additional information associated with the directory service that can render the network more vulnerable to additional attacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for detecting directory reconnaissance in a directory service. For instance, a system may include a sensor and a directory reconnaissance detector, each of which is executing on one or more computing devices. The sensor is configured to determine whether a query that is submitted to a directory server is a suspicious query and, if the query is determined to be a suspicious query, transmit the suspicious query to the directory reconnaissance detector. The director reconnaissance detector includes a receiver, a context obtainer, an alert determiner and an alert transmitter. The receiver is configured to receive the query from the sensor and the context obtainer is configured to obtain context information associated with the query. The alert determiner is configured to determine whether a security alert should be generated based at least on the suspicious query and the context information. The alert transmitter is configured to generate the security alert responsive to a determination that the security alert should be generated.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
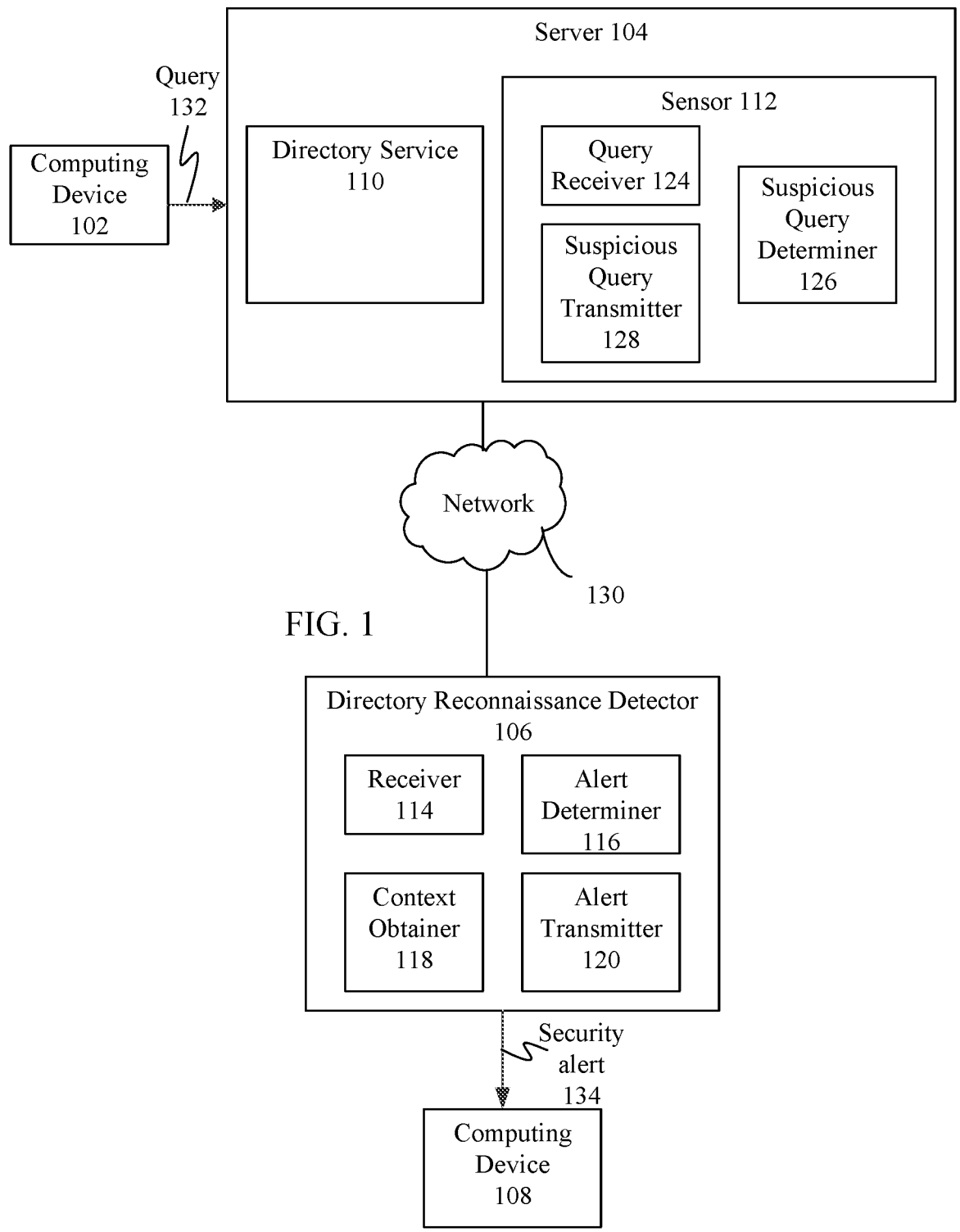
FIG. 1 shows a block diagram of a system for detecting directory reconnaissance in a directory service, according to an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Detecting Directory Reconnaissance in a Directory Service As described above, in some directory service architectures, such as in Microsoft Active Directory®, attackers may be capable of compromising a machine to obtain access to a server that can respond to queries on behalf of the directory service, such as a domain controller. Once an attacker obtains access to such a server, the attacker may then query the directory service in certain ways, such as using by using Lightweight Directory Access Protocol (LDAP) queries, to obtain as many details as possible regarding the directory service, environment, and the domain. For instance, the attacker may gain details regarding users in the directory, groups or sensitive groups in the directory, computer accounts in the directory, or the like. This can enable the attacker to graph or otherwise obtain an idea of what the domain looks like and/or develop a better attack strategy. This is troublesome for various reasons, including that the attackers can use the information they obtain to launch targeted attacks on certain network resources, to obtain additional privileges within the network, or simply to determine whether maintaining an attack is worthwhile.

This method of using queries to attack a directory service may be referred to as directory reconnaissance. Embodiments described herein help address these and other issues related to such directory reconnaissance. For instance, embodiments described herein enable the monitoring, analyzing, and reporting of queries submitted to a directory service. In embodiments, to achieve this, a sensor is installed on a directory service. This sensor may monitor and analyze queries submitted to the directory service to identify queries that are suspicious. In embodiments, a query that is deemed suspicious is one that may have been submitted by an attacker. Furthermore, a suspicious query may be one that is determined to be a sensitive query or an enumeration query, as discussed in greater detail hereinafter.

Embodiments enable the reporting of suspicious queries in various ways. For example, the aforementioned sensor may collect and report suspicious query data during a learning period. The learning period may be implemented as a sliding time window, constantly shifting forward in time to ensure that the most recent query data is collected and used for learning. In this way, the learning period query data can be utilized to provide a context for determining if a suspicious query submitted during a detection period is normal or benign such that the suspicious query can be ignored, or abnormal or malicious such that it can be inferred that the directory service is under attack.

As such, embodiments described herein enable the identification and transmission of suspicious queries for remote analysis during a detection period. For instance, and in embodiments, the sensor may transmit suspicious queries to a remote directory reconnaissance detector for analysis. In this way, if a query is deemed suspicious by the sensor, the sensor may report the data to a remote directory reconnaissance detector so that it can perform further analysis to determine if the suspicious query is normal/benign or abnormal/malicious. As indicated above, the remote directory reconnaissance detector may make this determination based at least in part on data obtained during a learning period. If the suspicious query is deemed to be normal or benign, the query is ignored. However, if the suspicious query is deemed to be abnormal or malicious, then a security alert is generated, and at least one associated computing device is notified that the directory service is under attack.

By enabling the detection of directory reconnaissance and the generation of alerts based on such detection (as well as other types of threat mitigation or remediation), embodiments described herein can improve the security, operation and performance of computers in a computing network. For example, embodiments described herein can protect computers in a computing network from malicious attacks that can result in the theft of sensitive data, the installation of malicious processes, and/or the computers being rendered less performant, inoperable or damaged.

Such embodiments may be implemented in various ways. For instance, FIG. 1 shows a block diagram of a system 100 for detecting directory reconnaissance in a directory service, according to an example embodiment. As shown in FIG. 1, system 100 includes a server 104 and a directory reconnaissance detector 106 that are interconnected via one or more network(s) 130. Network 130 is intended to represent one or more physical links between computing devices or other electronic devices that enable the communication of data there between. Network 130 may include any type of network, including but not limited to a local area network (LAN), wide area network (WAN) such as the Internet, a telecommunication network, or the like. Network 130 may further comprise one or more wired and/or wireless networks or links. Communication over network 130 may be carried out using any of a wide variety of well-known wired and wireless network communication protocols.

As further shown in FIG. 1, system 100 includes a computing device 102 that is communicatively coupled to server 104 and a computing device 108 that is communicatively coupled to directory reconnaissance detector 106. These couplings may be wired or wireless, and may be implemented via network 130 or independently thereof. Computing device 102 is intended to represent a computing device via which a query may be submitted to a directory service. Computing device 108 is intended to represent a computing device via which a security alert may be received.

Computing device 102 and computing device 108 may be any type of mobile computing device (e.g., a Microsoft® Surface® device, a laptop computer, a notebook computer, a tablet, a netbook, etc.), a mobile phone (e.g., a cell phone, a smart phone such as a Microsoft Windows® phone, an Apple iPhone, a phone implementing the Google® Android™ operating system, a Palm® device, a Blackberry® device, etc.), or a stationary computing device such as a desktop computer or PC (personal computer), etc. It is noted that although a single computing device 102 and a single computing device 108 are shown in system 100, it should be understood that any number of such computing devices may exist in system 100.

Server 104 is intended to generally represent a machine that provides functionality on demand to other programs or devices, which in some instances may be referred to as clients. For instance, server 104 may execute software that implements a directory service to which a query may be submitted by a machine that is connected thereto. In particular and as shown in FIG. 1, server 104 includes a directory service 110 and a sensor 112. Directory service 110 comprises part of a shared information infrastructure for locating, managing, administering and organizing everyday items and network resources. Among other functions, directory service 110 is configured to respond to security authentication requests within a server domain as well as to respond to queries as will be discussed herein. In embodiments, server 104 may represent a domain controller within a Microsoft Windows NT server computing environment and directory service 110 may represent Microsoft Active Directory® Service, although these examples are not intended to be limiting and the embodiments described herein may be implemented in other computing environments and directory services.

Sensor 112 is intended to represent software that is installed on server 104 and is configured to collect, analyze, and report data associated with the server. As shown in FIG. 1, sensor 112 includes a query receiver 124, a suspicious query determiner 126, and a suspicious query transmitter 128. Query receiver 124 is configured to receive queries submitted to directory service 110. Such queries may be submitted to directory service by other machines (e.g., such as computing device 102) or by processes running on server 104 itself. As will be discussed below, query receiver 124 collects and reports queries and the corresponding query data during both a learning period and a detection period. In embodiments, these queries and corresponding data are used by system 100 to determine if directory service 110 is under attack.

Suspicious query determiner 126 is configured to analyze each received query to determine if it is a suspicious query. In embodiments, and as discussed below, suspicious query determiner 126 determines if received queries are suspicious both during the learning period and during the detection period. As indicated above, a query may be determined to be suspicious if it is likely submitted by an attacker and in some embodiments may encompass a sensitive query or an enumeration query. Suspicious query transmitter 128 is configured to transmit each suspicious query and corresponding query data to remote directory reconnaissance detector 106. In embodiments, and discussed in greater detail hereinafter, suspicious query transmitter 128 transmits suspicious queries and corresponding query data during both the learning period and the detection period, to be used in different ways.

Directory reconnaissance detector 106 is a computing device that is configured to receive and analyze suspicious queries and corresponding query data to detect directory reconnaissance in an associated directory service. As shown in FIG. 1, directory reconnaissance detector 106 includes a receiver 114, an alert determiner 116, a context obtainer 118, and an alert transmitter 120. In embodiments, and as discussed in detail hereinafter, directory reconnaissance detector 106 is configured to receive suspicious queries that were submitted to a directory service and corresponding query data for analysis. For instance, and in embodiments, receiver 114 is configured to receive from sensor 112 suspicious queries that were submitted to directory service 110 for analysis. Receiver 114 may also be configured to receive suspicious queries from other sensors (not shown in FIG. 1 for the sake of illustrative simplicity) installed on other servers within system 100. For example, receiver 114 may be configured to receive suspicious queries from any number of sensors installed on servers included in network 100 that are configured to receive and process queries against a directory service, wherein the number of sensors may be in the tens, hundreds, or even thousands of sensors.

In embodiments, and discussed in detail hereinafter, receiver 114 receives queries and query data during a learning period and a detection period, to be used in different ways. For instance, and as indicated above, directory reconnaissance detector 106 is configured to obtain context information about queries received during the detection period. In embodiments, context obtainer 118 may obtain the context information in various ways, such as from query data obtained during the learning period, discussed in greater detail hereinafter.

Directory reconnaissance detector 106 is further configured to determine if a security alert should be generated for a given query and if so, generate and transmit the security alert. For instance, alert determiner 116 is configured to determine if a security alert should be created for a particular suspicious query received from sensor 112 during the detection period. In embodiments, and discussed in greater detail hereinafter, alert determiner 116 may make this determination in various ways, utilizing a variety of different information, such as the aforementioned context information. Furthermore, alert transmitter 120 is configured to transmit a security alert to one or more computing devices, such as computing device 108. As indicated above, the security alert may indicate that the directory service is under attack.

Figure 2:
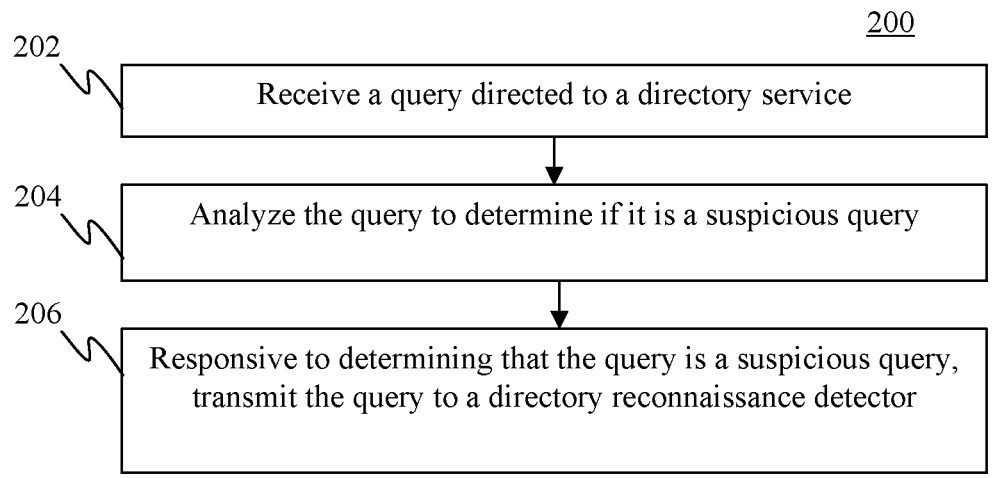
FIG. 2 shows a flowchart of a method for determining that a query is a suspicious query and transmitting the suspicious query to a directory reconnaissance detector, according to an example embodiment.

To help illustrate the foregoing, FIG. 2 will now be described. In particular, FIG. 2 shows a flowchart 200 of a method for transmitting a suspicious query from a sensor to a directory reconnaissance detector, according to an example embodiment. In an embodiment, flowchart 200 may be implemented by sensor 112 of FIG. 1. For the purposes of illustration, flowchart 200 of FIG. 2 is described with continued reference to FIG. 1. Other structural and operational embodiments will be apparent to persons skilled in the relevant art(s) based on the following discussion regarding flowchart 200 and FIG. 1.

Flowchart 200 of FIG. 2 begins with step 202. In step 202, a query directed to a directory service is received. For instance, and with reference to FIG. 1, query receiver 124 may be configured to receive query 132 directed to directory service 110. In embodiments, query 132 may represent a request for information from directory service 110. As indicated above, query receiver 124 may receive query 132 if it is submitted in either the learning period or the detection period. In embodiments, query 132 may comprise a Lightweight Directory Access Protocol (LDAP) query, although this is only one example, and embodiments described herein may apply to any type of query formatted in accordance with any type of query protocol.

In step 204, the query is analyzed to determine if it is a suspicious query. For instance, and with reference to FIG. 1, suspicious query determiner 126 may be configured to analyze query 132 to determine if it is a suspicious query. In embodiments, the query may be deemed suspicious based on a variety of factors, including but not limited to a form and/or content of the query, an origin machine or process of the query, a time period in which the query is received, or any other information included in or associated with the query.

Suspicious query determiner 126 may be configured to make this determination in various ways. For instance, in an embodiment, suspicious query determiner 126 may determine that a query is suspicious if it is determined to be an enumeration query. An enumeration query may comprise a query that would be expected to return a relatively large set of answers on different identifiers in a domain. For example, an enumeration query may comprise a request for information from a directory service that is filtered in a manner that would be expected to return all the objects of a certain type or within a certain group.

As a particular example, in a Microsoft Active Directory® implementation, an enumeration query may be one that includes the parameter values (objectclass=*, scope=2, baseDN=DC1 . . . Users).

As another example, an enumeration query may be one that includes any of the filters "OBJECTCLASS", "OBJECTCATEGORY", or "SAMACCOUNTTYPE", wherein such filters have a value selected from one of "GROUP", "USER", "DOMAIN", "PERSON", "COMPUTER", "SITE", "ORGANIZATIONALUNIT", "ORGANIZATIONALPERSION", "805306369", "805306368", "268435456", "GROUPPOLICYCONTAINER", or "SUBNET".

As yet another example, an enumeration query may be one that includes any of the filters "OBJECTCLASS", "OBJECTCATEGORY", "SAMACCOUNTTYPE", "SAMACCOUNTNAME", "DISTINGUISHDNAME", "NAME", "SERVICEPRINCIPALNAME", or "USERPRINCIPALNAME", wherein such filter have a value of "*" (i.e., a wildcard value).

Still other aspects of a query may be analyzed to determine if it is an enumeration query or not. For example, in some embodiments, an enumeration query would not be one that is submitted by a computer about itself. Also, a query that qualifies as an enumeration query may be one that is not specific in nature. For example, with respect to a Microsoft Active Directory® implementation, an enumeration query might be one that has a has a baseDN that is not a Security Identifier (SID), a Globally Unique Identifier (GUID), or a Distinguished Name (DN), of a group, user, or machine. Still further, an enumeration query may be one that has a scope of 2.

In certain embodiments, queries emanating from certain machines or processes may be automatically identified as being or not being enumeration queries. For example, queries emanating from domain controllers or servers that operate to perform security functions may be ignored when identifying enumeration queries in certain embodiments. Likewise, queries emanating from a local host and/or benign local processes on a directory server may be ignored when identifying enumeration queries in certain embodiments.

In embodiments, suspicious query determiner 126 may also determine that a query is suspicious if it is determined to be a sensitive query. A sensitive query may be, for example, a query that requests a result that is deemed sensitive (e.g., for reasons pertaining to network security, data privacy, or both). For example, a query that seeks information about certain groups within a domain that are considered sensitive might be deemed a sensitive query. For example, such sensitive groups may include domain administrators, enterprise administrators, or the like, since such groups may include users with relatively powerful privileges in relation to accessing and modifying resources of the network.

In an embodiment, a sensitive query may be a query of any scope. A sensitive query may be one that targets a sensitive GUID. For example, a sensitive query may include a filter ObjectGuid= . . . that specifies a sensitive GUID or a baseDN <GUID= . . . > that specifies a sensitive GUID. As another example, a sensitive query may be one that targets a sensitive SID (which might be a Hex SID that needs to be translated). For example, a sensitive query may include a sensitive SID in a filter, such as in the filter (&(| (OBJECTCLASS=USER) (OBJECTCLASS=COMPUTER) (OBJECTCLASS=GROUP))(OBJECTSID=S-1-5-21-72051607-1745760036-109187956-72271)), or may have a BaseDN that includes a sensitive SID, e.g., BaseDN <Sid=1-2-3 . . . >. As still another example, a sensitive query may be one that targets a sensitive DN. For example, a sensitive query may include a sensitive DN in a filter, such as in the filter DISTINGUISHEDNAME= . . . , or may have a BaseDN that is sensitive. As yet another example, a sensitive query may be one that includes SAMACCOUNTNAME in the filter.

In certain embodiments, queries emanating from certain machines or processes may be automatically identified as being or not being sensitive queries. For example, queries emanating from domain controllers or servers that operate to perform security functions may be ignored when identifying sensitive queries in certain embodiments. Likewise, queries emanating from a local host and/or benign local processes on a directory server may be ignored when identifying sensitive queries in certain embodiments.

In step 206, responsive to determining that the query is a suspicious query, the query is transmitted to a directory reconnaissance detector. For instance, and with reference to FIG. 1, suspicious query transmitter 128 may be configured to transmit query 132 to directory reconnaissance detector 106 responsive to it being determined that query 132 is a sensitive or an enumeration query (i.e., a suspicious query). As noted above, during the learning period, suspicious query transmitter 128 transmits query 132 to directory reconnaissance detector 106 so that query 132 can be used to help provide context for determining if later queries are normal/benign or abnormal/malicious. Furthermore, during the detection period, suspicious query transmitter 128 transmits query 132 to directory reconnaissance detector 106 to determine if directory service 122 is under attack. In either period, directory reconnaissance detector 106 may receive query 132. Directory reconnaissance detector 106 may operate in various ways to perform its functions.

Figure 3:
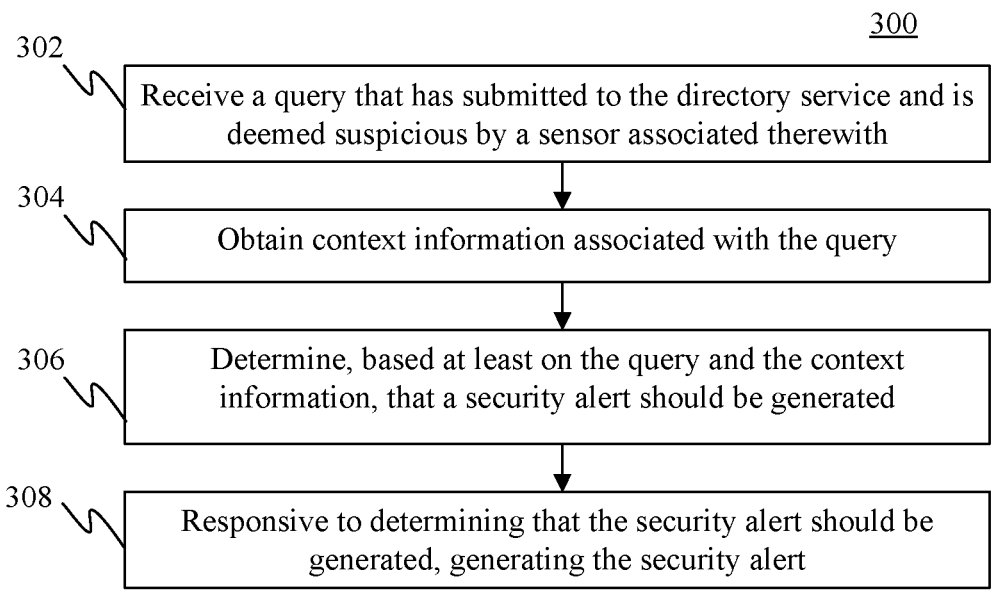
FIG. 3 shows a flowchart of a method for detecting directory reconnaissance in a directory service, according to an example embodiment.

For example, FIG. 3 shows a flowchart 300 of a method for detecting directory reconnaissance in a directory service, according to an example embodiment. In an embodiment, flowchart 300 may be implemented by directory reconnaissance detector 106 of FIG. 1. For the purposes of illustration, flowchart 300 of FIG. 3 is described with continued reference to FIG. 1. Other structural and operational embodiments will be apparent to persons skilled in the relevant art(s) based on the following discussion regarding flowchart 300 and FIG. 1.

Flowchart 300 begins with step 302. In step 302, a query that has been submitted to the directory service and is deemed suspicious by a sensor associated therewith is received. For instance, and with reference to FIG. 1, receiver 114 may receive query 132 that has been submitted to directory service 122 and deemed suspicious by sensor 112. As indicated above, in certain embodiments, a query may be deemed suspicious if the query is determined to be a sensitive query or an enumeration query.

In step 304, context information associated with the query is obtained. For instance, and with reference to FIG. 1, context obtainer 118 may obtain context information associated with the query. Context information may comprise any information about or associated with a query, such as but not limited to information that identifies a machine or process from which the query emanated, a type of machine or process from which the query emanated, a user associated with the query, a time or time period in which the query was sent or received, or the like. Also, as indicated above, context information may include or be derived from query data received by receiver 114 during a learning period. In some embodiments, the learning period comprises a sliding time window. Context information derived from query data obtained during the learning period may include, for example, an indication whether a computer that submitted a query has submitted the same query during the learning period. Additionally, or alternatively, the context information derived from query data obtained during the learning period may include an indication whether a query was submitted by more than a predetermined number of computers during the learning period. Additionally, or alternatively, the context information derived from query data obtained during the learning period may include an indication whether a computer that submitted a query queried more than a predetermined number of identities during the learning period.

In step 306, it is determined, based at least on the query and the context information, that a security alert should be generated. For instance, and with reference to FIG. 1, alert determiner 116 may determine that a security alert should be generated based at least on the query and the context information. In embodiments, and discussed in detail hereinafter, alert determiner 116 may determine that a security alert should be generated if it is determined based on the context information that the query is abnormal or malicious. Alternatively, if it is determined that the query is normal or benign based on the context information, alert determiner 116 may determine that a security alert should not be generated.

In step 308, responsive to determining that the security alert should be generated, the security alert is generated. For instance, and with reference to FIG. 1, alert transmitter 120 may generate the security alert responsive to alert determiner 116 determining that the security alert should be generated. Furthermore, and with continued reference to FIG. 1, alert transmitter 120 may transmit security alert 134 to one or more computing devices, such as computing device 108. In embodiments, security alert 134 may be in the form of an email, a text message, a screen popup, or the like.

Figure 4:
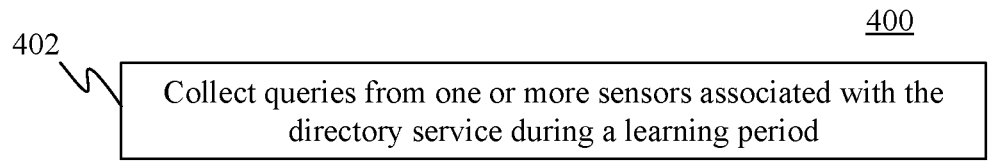
FIG. 4 shows a flowchart of a method for obtaining context information from one or more sensors, according to an example embodiment.

In some embodiments, directory service 122 of system 100 may be distributed across multiple servers. As such, and in embodiments, system 100 may include multiple sensors associated with respective domain controllers, each reporting data associated with suspicious queries. For instance, FIG. 4 shows a flowchart 400 for obtaining context information from multiple sensors, according to an example embodiment. In an embodiment, flowchart 400 may be implemented by context obtainer 118 of FIG. 1. For the purposes of illustration, flowchart 400 of FIG. 4 is described with continued reference to FIG. 1. Other structural and operational embodiments will be apparent to persons skilled in the relevant art(s) based on the following discussion regarding flowchart 400 and FIG. 1.

Flowchart 400 begins with step 402. In step 402, queries are collected from one or more sensors associated with the directory service during a learning period. For instance, and with reference to FIG. 1, context obtainer 118 may collect queries that are deemed suspicious from sensor 112 as well as additional sensors associated with directory service 122 during the learning period. In this way, if directory service 122 is distributed across multiple servers, directory reconnaissance detector 106 is ensured to have accurate query data for establishing a context within which to determine if directory service 122 is under attack.

Figure 5:
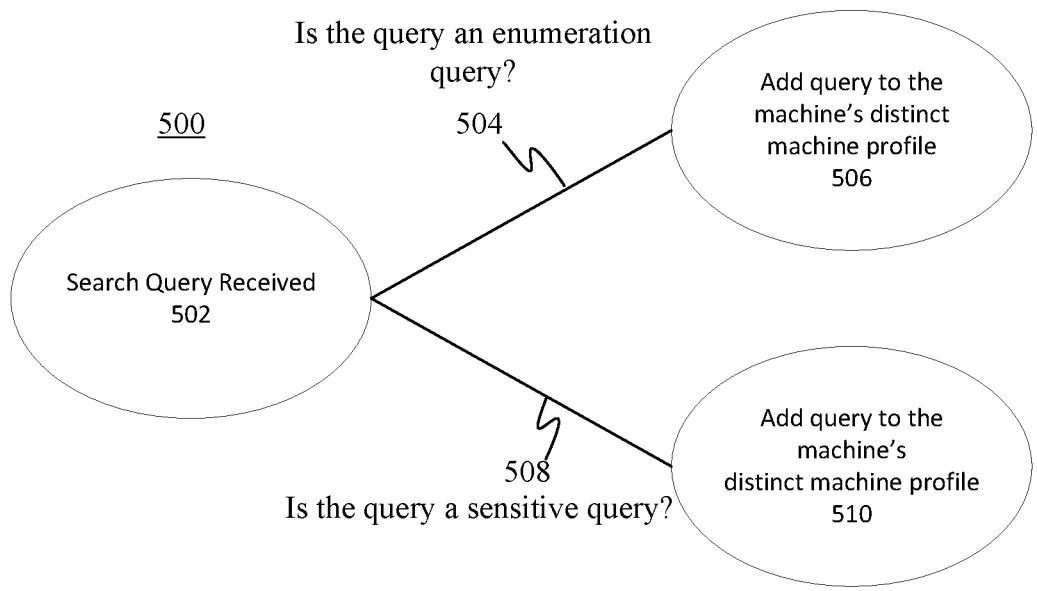
FIG. 5 shows a flow diagram of a method for analyzing a search query during a learning period, according to an example embodiment.

FIG. 5 shows a flow diagram 500 of a method for analyzing a search query during the learning period, according to one example embodiment. In embodiments, sensor 112 may operate according to diagram 500. As shown in FIG. 5, flow diagram 500 begins with step 502. In step 502, a search query is received. For instance, and with continued reference to FIG. 1, query receiver 124 of sensor 112 receives a search query that was submitted to directory service 122 from computing device 102.

As shown in FIG. 5, after the search query is received in step 502, at step 504 it is determined if the search query is an enumeration query. For instance, and with continued reference to FIG. 1, suspicious query determiner 126 may determine if the search query is an enumeration query. In the event that it is determined that the search query is an enumeration query, then control flows to step 506 and the search query is added to a distinct machine profile for the machine from which the query originated.

In step 508, it is determined if the search query is a sensitive query. For instance, and with continued reference to FIG. 1, suspicious query determiner 126 may determine if the search query is a sensitive query. In the event that it is determined that the search query is a sensitive query, then control flows to step 510 and the search query is added to the distinct machine profile for the machine from which the query originated. However, if the search query is neither an enumeration query nor a sensitive query, then the query will not be added to the distinct machine profile for the machine from which the query emanated.

The suspicious queries that are added to the machine's distinct profile form the basis of the context information that can then be used during the detection period to determine if a suspicious query is normal/benign or abnormal/malicious as will be discussed in more detail below.

Figure 6:
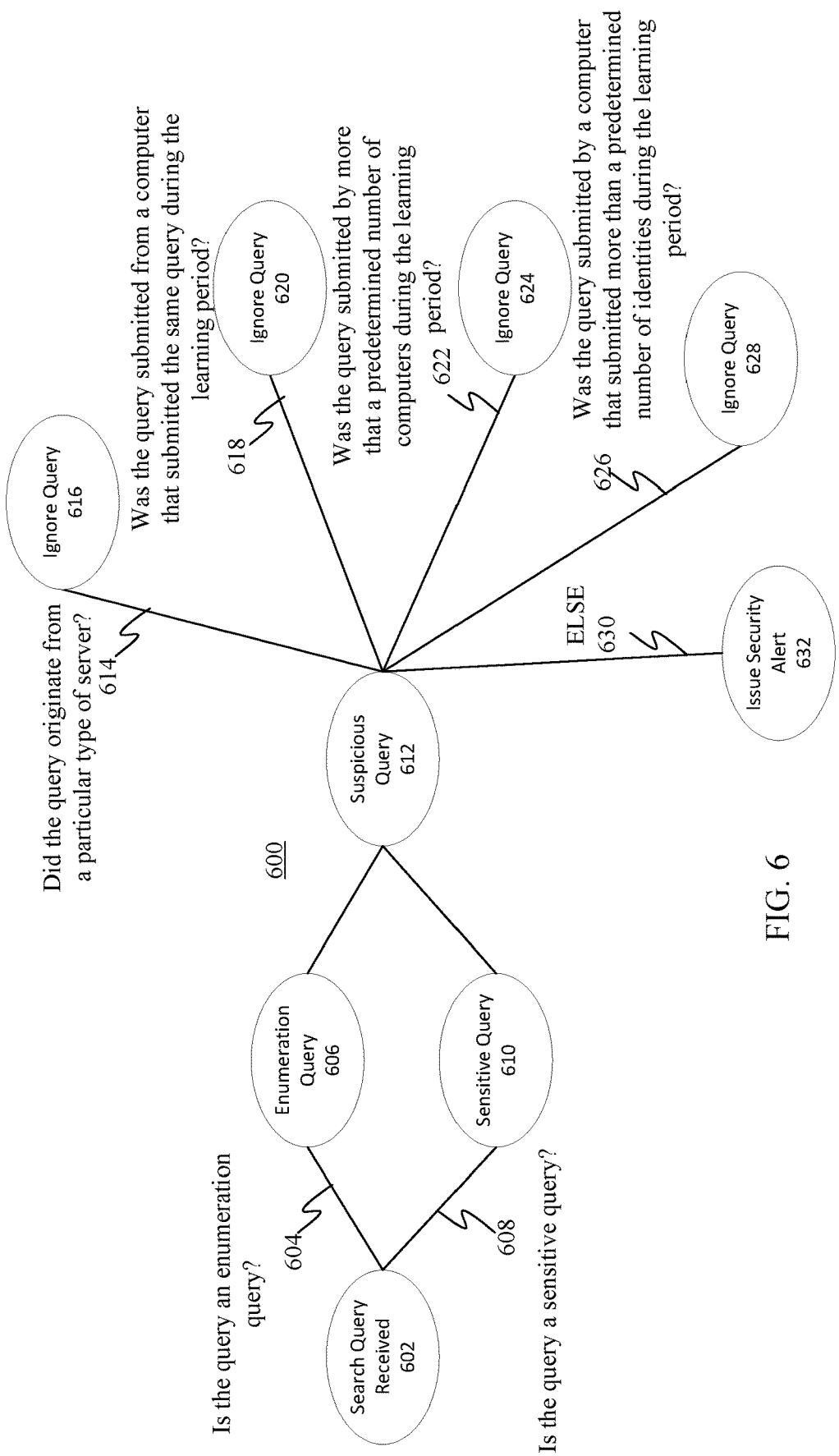
FIG. 6 shows a flow diagram of a method for determining if a security alert should be issued during a detection period, according to an example embodiment.

As indicated above, during the detection period, system 100 determines if a security alert should be issued. FIG. 6 shows a flow diagram 600 of a method for issuing a security alert during a detection period, according to an example embodiment. As shown in FIG. 6, flow diagram 600 begins with step 602. In step 602, a search query is received. For instance, and with reference to FIG. 1, query receiver 124 of sensor 112 receives search query 132 that was submitted to directory service 122 from computing device 102.

As shown in FIG. 6, after the search query is received at step 602, in step 604 it is determined if the query is an enumeration query. For instance, and with continued reference to FIG. 1, suspicious query determiner 126 of sensor 112 may determine if the search query is an enumeration query. In the event that suspicious query determiner 126 determines that the search query is an enumeration query, then suspicious query determiner 126 will categorize the search query as an enumeration query, as represented by step 606.

In step 608, it is determined if the query is a sensitive query. For instance, and with continued reference to FIG. 1, suspicious query determiner 126 of sensor 112 may determine if the search query is a sensitive query. In the event that suspicious query determiner 126 determines that the search query is a sensitive query, then suspicious query determine 126 will categorize the search query as a sensitive query, as represented by step 610.

As shown in diagram 600, if the search query is deemed to be an enumeration query or a sensitive query, the search query is transmitted as a suspicious query in step 612. For instance, and with continued reference to FIG. 1, suspicious query transmitter 128 of sensor 112 transmits the suspicious query to receiver 114 of directory reconnaissance detector 106 so that alert determiner 116 of directory reconnaissance detector can determine if an alert should be generated based on the suspicious query and associated context information. Flow diagram 600 further outlines the process for determining if an alert should be generated based on the suspicious query and associated context information or whether it can be ignored in accordance with one example embodiment.

For instance, and as shown in FIG. 6, in step 614 it is determined if the query originated from a particular type of server. For instance, and as noted above, if alert determiner 116 determines that the query originated from a domain server or a server configured to perform security operations, then alert determiner 116 may determine that the query can be ignored. In this case, the type of machine from which the query was obtained is part of the context information associated with the query and obtained by context obtainer 118. In the event that it is determined that the query originated from the particular type of server, control flows to step 616 and the query is ignored. However, if it is determined that the query did not originate from the particular type of server then control flows to step 618.

In step 618 it is determined if the query was submitted from a computer that submitted the same query during the learning period. For instance, if alert determiner 116 determines that the query was submitted from computing device 102 and also that during the learning period the same query was submitted from computing device 102, then alert determine 116 may determine that the query can be ignored. In this case, the fact that the same query was or was not submitted from computing device 102 during the learning period is part of the context information associated with the query and obtained by context obtainer 118. In the event that it is determined that the query was submitted from a computer that submitted the same query during the learning period, control flows to step 620 and the query is ignored. However, if it is determined that the query was not submitted from a computer that submitted the same query during the learning period then control flows to step 622. Note that in alternate embodiments, the foregoing test may be premised on whether a similar (as opposed to exactly the same) query was submitted from the computer during the learning period, or whether a certain number of the same or similar queries were submitted from the same computer during the learning period. In certain embodiments, two queries are considered to be the same or similar if they have the same filter, scope, and baseDN.

In step 622 it is determined if the same query was submitted by more than a predetermined number of different computers during the learning period. For instance, in one embodiment, if the same query was submitted from at least three other computing devices during the learning period, the query can be ignored. However, this example is not intended to be limiting and any predetermined number of computing devices may be used to make this determination. In this case, the number of computers that submitted the same query during the learning period is part of the context information associated with the query and obtained by context obtainer 118. In the event that it is determined that the query was submitted by more than the predetermined number of computers during the learning period, control flows to step 624 and the query is ignored. However, if it is determined that the query was not submitted by more than the predetermined number of computers during the learning period then control flows to step 626. Note that in alternate embodiments, the foregoing test may be premised on whether a similar (as opposed to exactly the same) query was submitted by more than the predetermined number of different computers during the learning period. In certain embodiments, two queries are considered to be the same or similar if they have the same filter, scope, and baseDN.

In step 626 it is determined if the query was submitted by a computer that submitted more than a predetermined number of identities during the learning period. For instance, in one embodiment, if the query was submitted by a computing device that also submitted more than 10 identities during the learning period, the query can be ignored. However, this example is not to be limiting sense and any number of identities may be used to make this determination. In this case, the number of identities submitted by the computer that submitted the query during the learning period is part of the context information associated with the query and obtained by context obtainer 118. In the event that it is determined that the query was submitted by a computer that submitted more than the predetermined number of identities during the learning the control flows to step 628 and the query is ignored. However, if it is determined that the query was not submitted by a computer that submitted more than the predetermined number of identities during the learning period then control flows to step 630.

In step 630, it is determined that all of the conditions tested for in steps 614, 618, 622 and 626 did not apply and thus control flows to step 632. Such an outcome indicates that the suspicious query has been deemed abnormal or malicious in view of the available context information. That is to say, the query has been deemed one that seems to indicate directory reconnaissance is occurring. In step 632, a security alert is issued. For instance, and with continued reference to FIG. 1, alert transmitter 120 generates security alert 134 and transmits it to one or more computing devices, such as computing device 108.

Although the foregoing contemplates the generation and transmission of a security alert when directory reconnaissance is detected, it should be noted that in further embodiments, additional mitigation or remediation steps may be taken as a result of such detection. For example, in accordance with further embodiments, in response to detecting directory reconnaissance, certain protective measures may automatically be taken within the network. Such automatic measures may include but are not limited to the implementation of a firewall, the adding of users or machines to a blacklist, the revocation of certain access privileges of a user or a machine, the hiding or deletion of resources, or the like.

III. Example Computer System Implementation

Computing device 102, server 104, directory reconnaissance detector 106, computing device 108, directory service 110, sensor 112, receiver 114, alert determiner 116, context obtainer 118, alert transmitter 120, query receiver 124, suspicious query determiner 126, suspicious query transmitter 128, flowchart 200, flowchart 300, flowchart 400, flow diagram 500, and/or flow diagram 600 may be implemented in hardware, or hardware combined with one or both of software and/or firmware. For example, computing device 102, server 104, directory reconnaissance detector 106, computing device 108, directory service 110, sensor 112, receiver 114, alert determiner 116, context obtainer 118, alert transmitter 120, query receiver 124, suspicious query determiner 126, suspicious query transmitter 128, flowchart 200, flowchart 300, flowchart 400, flow diagram 500, and/or flow diagram 600 may be implemented as computer program code/instructions configured to be executed in one or more processors and stored in a computer readable storage medium. Alternatively, computing device 102, server 104, directory reconnaissance detector 106, computing device 108, directory service 110, sensor 112, receiver 114, alert determiner 116, context obtainer 118, alert transmitter 120, query receiver 124, suspicious query determiner 126, suspicious query transmitter 128, flowchart 200, flowchart 300, flowchart 400, flow diagram 500, and/or flow diagram 600 may be implemented as hardware logic/electrical circuitry.

For instance, in an embodiment, one or more, in any combination, of computing device 102, server 104, directory reconnaissance detector 106, computing device 108, directory service 110, sensor 112, receiver 114, alert determiner 116, context obtainer 118, alert transmitter 120, query receiver 124, suspicious query determiner 126, suspicious query transmitter 128, flowchart 200, flowchart 300, flowchart 400, flow diagram 500, and/or flow diagram 600 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
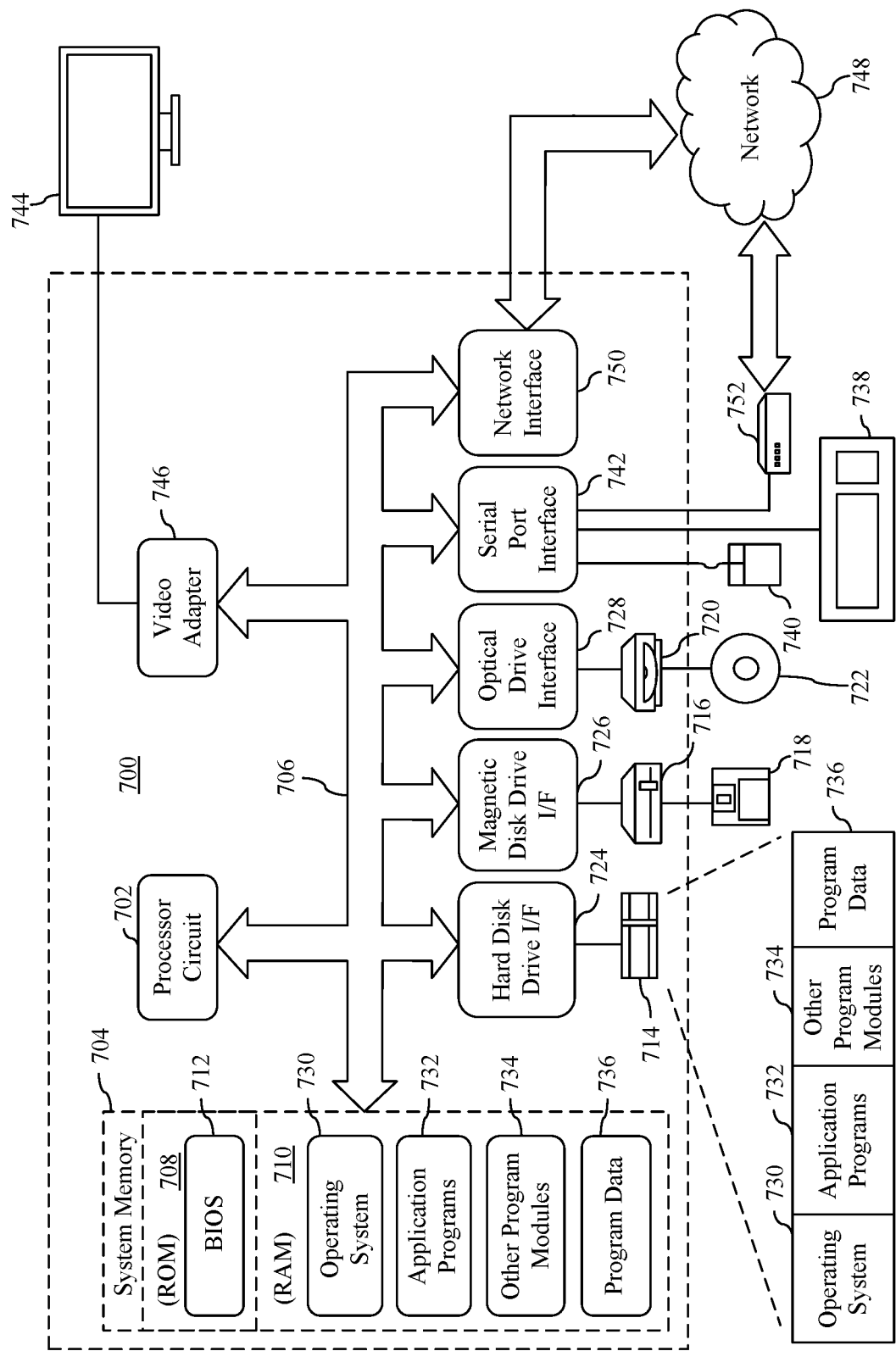
FIG. 7 is a block diagram of an example processor-based computer system that may be used to implement various embodiments.

FIG. 7 depicts an exemplary implementation of a computing device 700 in which embodiments may be implemented. For example, computing device 102, server 104, directory reconnaissance detector 106, and computing device 108 may each be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing any of the features of computing device 102, server 104, directory reconnaissance detector 106, computing device 108, directory service 110, sensor 112, receiver 114, alert determiner 116, context obtainer 118, alert transmitter 120, query receiver 124, suspicious query determiner 126, suspicious query transmitter 128, flowchart 200, flowchart 300, flowchart 400, flow diagram 500, and/or flow diagram 600 (or any one or more steps of such flowcharts), and/or further embodiments described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A method for detecting directory reconnaissance in a directory service is described herein. The method comprises receiving a query that has been submitted to the directory service and is deemed suspicious by a sensor associated therewith; obtaining context information associated with the query; determining, based at least on the query and the context information, that a security alert should be generated; and responsive to determining that the security alert should be generated, generating the security alert.

In one embodiment of the foregoing method, the query comprises a Lightweight Directory Access Protocol (LDAP) query.

In another embodiment of the foregoing method, the sensor comprises software executing on a directory server to which the query is submitted.

In another embodiment of the foregoing method, the query is deemed suspicious based at least on one or more of a form of the query or a content of the query.

In another embodiment of the foregoing method, the query is deemed suspicious based at least in part on the query being deemed one of an enumeration query or a sensitive query.

In another embodiment of the foregoing method, the context information comprises an indication of a type of server from which the query originated.

In another embodiment of the foregoing method, obtaining the context information comprises: collecting queries from one or more sensors associated with the directory service during a learning period.

In another embodiment of the foregoing method, the learning period comprises a sliding time window.

In another embodiment of the foregoing method, the context information comprises one or more of: an indication whether a computer that submitted the query has submitted the same query during the learning period; an indication whether the query was submitted by more than a predetermined number of computers during the learning period; or an indication whether the computer that submitted the query queried more than a predetermined number of identities during the learning period.

A system is described herein. The system includes a sensor executing on at least a first computing device, the sensor being configured to determine that a query that is submitted to a directory service is a suspicious query; and a directory reconnaissance detector executing on at least a second computing device, the directory reconnaissance director comprising: a receiver configured to receive the query from the sensor; a context obtainer configured to obtain context information associated with the query; an alert determiner configured to determine that a security alert should be generated based at least on the query and the context information; and an alert transmitter configured to generate the security alert responsive to the determination that the security alert should be generated.

In one embodiment of the foregoing system, the query comprises a Lightweight Directory Access Protocol (LDAP) query.

In another embodiment of the foregoing system, the sensor is configured to determine that the query is a suspicious query based at least on one or more of a form of the query or a content of the query.

In another embodiment of the foregoing system, the sensor is configured to determine that the query is a suspicious query by determining that the query is one of an enumeration query or a sensitive query.

In another embodiment of foregoing system, the context information comprises an indication of a type of server from which the query originated.

In another embodiment of the foregoing system, the context obtainer is configured to obtain the context information by collecting queries from one or more sensors associated with the directory service during a learning period.

In another embodiment of the foregoing system, the learning period comprises a sliding time window.

In another embodiment of the foregoing system, the context information comprises one or more of: an indication whether a computer that submitted the query has submitted the same query during the learning period; an indication whether the query was submitted by more than a predetermined number of computers during the learning period; or an indication whether the computer that submitted the query queried more than a predetermined number of identities during the learning period.

A computer-readable medium having computer program logic recorded thereon that when executed by at least one processor causes the at least one processor to perform a method is described herein. The method comprises: receiving a query that has been submitted to a directory service and has been deemed suspicious by a sensor associated with the directory service; obtaining context information associated with the query; determining, based at least on the query and the context information, that a security alert should be generated; and responsive to determining that the security alert should be generated, generate the security alert.

In one embodiment of the foregoing computer-readable medium, the query comprises a Lightweight Directory Access Protocol (LDAP) query.

In another embodiment of the foregoing computer-readable medium, the sensor comprises software executing on a directory server to which the query is submitted.

In another embodiment of the foregoing computer-readable medium, the query is deemed suspicious based at least on one or more of a form of the query or a content of the query.

In another embodiment of the foregoing computer-readable medium, the query is deemed suspicious based at least in part on the query being deemed one of an enumeration query or a sensitive query.

In another embodiment of the foregoing computer-readable medium, the context information comprises an indication of a type of server from which the query originated.

In another embodiment of the foregoing computer-readable medium, obtaining the context information comprises: collecting queries from one or more sensors associated with the directory service during a learning period.

In another embodiment of the foregoing computer-readable medium, the learning period comprises a sliding time window.

In another embodiment of the foregoing computer-readable medium, the context information comprises one or more of: an indication whether a computer that submitted the query has submitted the same query during the learning period; an indication whether the query was submitted by more than a predetermined number of computers during the learning period; or an indication whether the computer that submitted the query queried more than a predetermined number of identities during the learning period.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for detecting directory reconnaissance in a directory service, comprising:
   receiving a query that has been submitted to the directory service and is deemed suspicious by a sensor associated therewith;
   obtaining context information associated with the query, the context information including information about queries collected from one or more sensors associated with the directory service during a learning period and comprising an indication whether a computer that submitted the query queried more than a predetermined number of identities during the learning period;
   determining whether one or more conditions apply to the query based at least on the context information;
   in response to determining that the one or more conditions do not apply to the query, determining that a security alert should be generated; and
   responsive to determining that the security alert should be generated, generating the security alert.

2. The method of claim 1, wherein the query comprises a Lightweight Directory Access Protocol (LDAP) query.

3. The method of claim 1, wherein the query is deemed suspicious based at least on one or more of a form of the query or a content of the query.

4. The method of claim 1, wherein the query is deemed suspicious based at least in part on the query being deemed one of an enumeration query or a sensitive query.

5. The method of claim 1, wherein the context information comprises an indication of a type of server from which the query originated.

6. The method of claim 1, wherein the learning period comprises a sliding time window.

7. The method of claim 1, wherein the query is deemed suspicious based at least on a time period in which the query is received.

8. A system comprising:
   a first computing device executing a sensor, the sensor being configured to determine that a query that is submitted to a directory service is a suspicious query; and
   a second computing device executing a directory reconnaissance detector, the directory reconnaissance detector comprising:
      a receiver configured to receive the query from the sensor;
      a context obtainer configured to obtain context information associated with the query, the context information including information about queries collected from one or more sensors associated with the directory service during a learning period and comprising an indication whether a computer that submitted the query queried more than a predetermined number of identities during the learning period;
      an alert determiner configured to:
         determine whether one or more conditions apply to the query based at least on the context information; and
         in response to determining that the one or more conditions do not apply to the query, determine that a security alert should be generated; and
      an alert transmitter configured to generate the security alert responsive to the determination that the security alert should be generated.

9. The system of claim 8, wherein the query comprises a Lightweight Directory Access Protocol (LDAP) query.

10. The system of claim 8, wherein the sensor is configured to determine that the query is a suspicious query by determining that the query is one of an enumeration query or a sensitive query.

11. The system of claim 8, wherein the context information comprises an indication of a type of server from which the query originated.

12. The system of claim 8, wherein the learning period comprises a sliding time window.

13. The system of claim 8, wherein the sensor is configured to determine that the query is a suspicious query based at least on one or more of a form of the query or a content of the query.

14. The system of claim 8, wherein the query is deemed suspicious based at least on a time period in which the query is received.

15. A computer-readable medium having computer program logic recorded thereon that when executed by at least one processor causes the at least one processor to perform a method, the method comprising:
   receiving a query that has been submitted to a directory service and has been deemed suspicious by a sensor associated with the directory service;
   obtaining context information associated with the query, the context information including information about queries collected from one or more sensors associated with the directory service during a learning period and comprising an indication whether a computer that submitted the query queried more than a predetermined number of identities during the learning period;

determining whether one or more conditions apply to the query based at least on the context information;

in response to determining that the one or more conditions do not apply to the query, determining that a security alert should be generated; and responsive to determining that the security alert should be generated, generate the security alert.

16. The computer-readable medium of claim 15, wherein the query is deemed suspicious based at least on one or more of a form of the query or a content of the query.

17. The computer-readable medium of claim 15, wherein the query is deemed suspicious based at least in part on the query being deemed one of an enumeration query or a sensitive query.

18. The computer-readable medium of claim 15, wherein the context information comprises an indication of a type of server from which the query originated.

19. The computer-readable medium of claim 15, wherein the query comprises a Lightweight Directory Access Protocol (LDAP) query.

20. The computer-readable medium of claim 15, wherein the learning period comprises a sliding time window.

* * * * *